United States Patent [19]

Jain

[11] Patent Number: 4,461,693

[45] Date of Patent: Jul. 24, 1984

[54] POLARITY REVERSAL ELECTRODES

[75] Inventor: Surendar M. Jain, Watertown, Mass.

[73] Assignee: Ionics Incorporated, Watertown, Mass.

[21] Appl. No.: 395,756

[22] Filed: Jul. 6, 1982

[51] Int. Cl.³ .............................................. B01D 13/02
[52] U.S. Cl. .................................................. 204/301
[58] Field of Search ........................ 204/301, 228, 248

[56] References Cited

U.S. PATENT DOCUMENTS

| | | | |
|---|---|---|---|
| 3,117,023 | 1/1964 | Tirrell | 204/128 |
| 3,291,716 | 12/1966 | Cioffi | 204/301 |
| 3,453,201 | 7/1969 | Mihara | 204/301 |
| 4,169,775 | 10/1979 | Kuo | 204/248 |
| 4,197,169 | 4/1980 | Zahn | 204/228 |

*Primary Examiner*—John F. Niebling
*Attorney, Agent, or Firm*—Norman E. Saliba

[57] ABSTRACT

A polarity reversing electrodialysis membrane stack containing a composite electrode at each end of the stack with each electrode having anode and cathode portions electrically insulated from each other. Current is supplied to the anode portion of one electrode and to the cathode portion of the other electrode with means for maintaining a trickle of current from the active anode of one electrode to the inactive anode of the other electrode. Upon reversal of stack polarity the electrodes change their polarities and the trickle currents runs to the other electrode. The invention also is directed to the use of noble metal coated electrodes wherein the coating covers substantially less than the total electrode surface which is in contact with electrolytic solution during use.

11 Claims, 4 Drawing Figures

POLARITY REVERSAL ELECTRODES

FIELD OF THE INVENTION

This invention relates to improvements in apparatus and processes employed in the electrodialysis of electrolytic solutions such as in desalting saline waters especially those in which polarity reversal of the membrane stacks is practiced. Specifically, the present invention is directed to novel noble-metal coated electrodes and to apparatus and processes for extending their lives by minimizing the noble metal loss therefrom, resulting in reduced electrodialysis costs and maintenance.

DESCRIPTION OF THE PRIOR ART

The technique of using periodic reversal of a membrane stack polarity is well known in the field of electrodialysis as is fully described for example in U.S. Pat. Nos. 3,341,441 Giuffrida & Parsi), 2,863,813 (Juda & McRae), 4,115,225 (Parsi) and others. For example, in the process for the desalination and concentration of brackish water by electrodialysis using ion exchange membranes, it is known that the technique of polarity reversal using single electrodes in each electrode chamber with the simultaneous interchange of the salt diluting and salt concentrating streams in the electrodialysis stack, is effective for the reduction or prevention of basic scale formation in or on the membranes and on the single electrodes. Basic scale built up on the cathode will dissolve when that electrode by polarity reversal becomes an anode due to the acid generated during the anodic cycle.

U.S. Pat. No. 3,192,148 (Chen) discloses another way of alleviating cathode scaling, however without the benefits of reversing the working current in the main body of the stack and interchanging the diluting and concentrating streams. Such a method positions a single electrode of fixed anodic polarity in one electrode compartment and a composite electrode in the other electrode compartment. The composite electrode comprises separate second and third electrodes in proximity to one another and of opposite polarity to each other. Current reversal is confined to said second and third electrodes. Upon reversal the polarity of this electrode pair reverses. This results in dislodging precipitate from the anode portion that may have formed thereon when that portion was previously the working cathode. Only platinum electrodes without substrates are disclosed. Chen's single fixed polarity electrode is not reversed and always stays as the anode. Such a system is satisfactory where the only problem is cathodic scaling, but generally however, the membranes also foul or scale if the stack polarity is not reversed. Thus the disclosure in the above mentioned prior art patent has limited applicability in that it ameliorates the scaling problem of the cathode but does not address itself to the scaling or fouling of membranes and hence is not suitable for use in the electrodialysis-reversal process (EDR). The electrode system of the present invention as will hereinafter be shown does not suffer from this defect since the complete electrodialysis stack is also subjected to current reversal, keeping both the membranes and electrodes substantially clean.

U.S. Pat. No. 3,384,568 (Kato et al) describes a chord type electrode for use in electrodialysis. This electrode is claimed to operate free of scale or precipitate due to the cleaning effect of the generated gas travelling up along the vertically oriented chords. The use of such a chord electrode is therefore limited since it requires vertical orientation of the electrodialysis stack and the unsupported chords can be easily damaged. Additionally the chord electrodes are difficult to use with electrode spacers of the type known as "tortuous path" spacers (U.S. Pat. No. 2,708,658) without suitable framing and use of an additional compartment which will however adversely effect hydraulic flow therethrough.

It has been found that the use of prior art short cycle reversal systems (i.e. those in which reversal takes place more often than once a day) reduces electrode life thus requiring that stacks be opened at frequent intervals to replace the failed electrodes. It is the usual practice in polarity reversal electrodialysis plants to use platinized electrolytic valve metals for both the cathode and anode electrodes since the usual satisfactory cathode materials e.g., iron, nickel, stainless steel, etc. would be rapidly damaged when used as anodes. On the other hand the usual satisfactory anode materials e.g., platinum, iridium, or rhodium clad, coated or plated valve metals when used alternately as cathodes and anodes have a short life span in short cycle reversal. Graphite has been used as an anode or cathode material but it has the drawback that its surface is gradually eroded necessitating the use of thick or large pieces. A graphite anode also has the tendency to shed carbon particles into the electrode rinse solution causing plugging or high pressure drops which of course limits its use.

U.S. Pat. No. 3,453,201 (Mihara et al) discloses the use of a composite, reversing, electrode at each end of an electrodialysis stack in long cycle reversal, (i.e., in which reversal does not take place more than once a day), wherein each composite electrode consists of an anode and a cathode portion electrically disconnected or insulated from each other. Both anodes and cathodes are pure titanium or tantalum; the anodes platinum coated. By the use of proper switching means one portion of each composite electrode is connected or energized at any one time with the other portion being simultaneously disconnected or de-energized. During polarity reversal the anode portion (platinum coated) of the first composite electrode is energized with the cathode portion (not coated) being de-energized and the anode portion of the second composite electrode is de-energized while the cathode portion is simultaneously energized. Thus, it can be seen that the electrode portion although not always maintained as an anode or a cathode, are never changed in their working polarity. The draw back of such a polarity reversal operation is that the disconnected (de-energized) anode portion of the composite electrode does in fact develope a cathodic potential and is subject to the problems previously described. As will hereinafter be shown, this mode of operation does not improve electrode life in short cycle ED i.e. it does not decrease loss of precious metal coating as compared to the system where a single polarity reversing electrode of the same area is positioned in each electrode compartment. Furthermore it is found that pure titanium as a substrate is subject to attack in short cycle electrodialysis, perhaps because it is subject to corrosion in acidic, reducing environments. Tantalum is not satisfactory as a substrate in either long or short cycle reversal because it is subject to hydrogen embrittlement.

For a fuller understanding of the invention, reference should be had to the following detailed disclosure taken in connection with the accompanying drawings in which.

Figure 1:
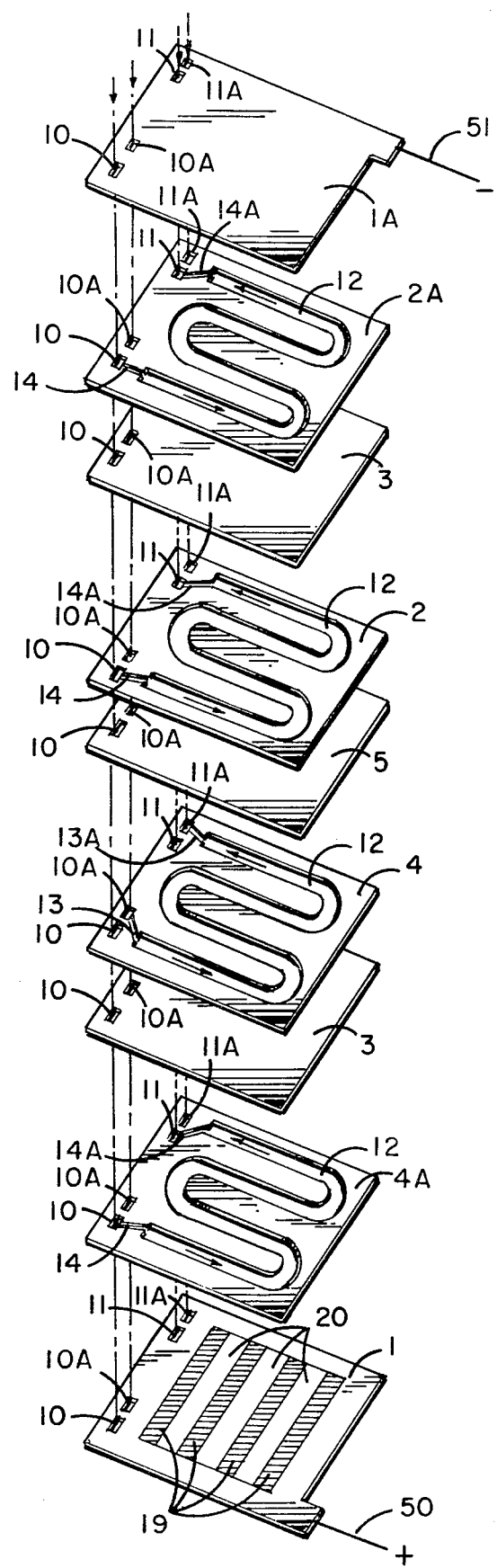
FIG. 1 is a perspective view of an electrodialysis system for testing electrodes shown in simple form with the structural elements in exploded relationship with one another. The system shown comprises one salt diluting chamber, one salt concentrating chamber and terminally located anode and cathode chambers.

As shown in the drawings and in particular in FIG. 1, the electrodialysis systems to which this invention is directed may comprise at least two cation-exchange membranes 3 and one anion exchange membrane 5 (or vice versa) confined between a pair of electrodes 1 and 1A. The electrodes 1 and 1A are connected to a source of direct current; the polarity being reversed at fixed intervals. Membranes 3 and 5 are preferably present as a plurality of alternating anion and cation exchange membranes, each separated from one another by fluid containing spacers or compartments such as 2 and 4. Spacer members 2 and 2A may also separate the end membranes from the respective electrodes to form electrode compartments.

Both the membranes and the spacers have monifold inlet (10 and 10A) and outlet holes (11 and 11A) for passage of liquid. The electrodes, spacers and membranes are so constructed and arranged that the inlet and outlet holes of the respective elements are aligned with one another whereby the influent solution, such as, for example an electrolyte, may pass through manifold inlet holes 10 or 10A of electrode 1A, through the various spacers and membranes and out through manifold holes 11 or 11A of the respective member to a common effluent pipe (not shown). Each spacer member of an electrodialysis stack is provided with a similarly designed flow path area connecting from one of the inlet or influent holes to one of the effluent or outlet holes whereby the electrolyte is caused to flow along and in contact with the adjacent ion-exchange membrane or electrode. As shown in drawing of FIG. 1, spacer members 4 may be provided with a tortuous flow path 12 which is similarly connected to inlet hold 10A and outlet hole 11A by connecting channels 13 and 13A, whereas spacer members 2A, 2 and 4A may also be provided with a tortuous flow path 12 which is similarly connected to inlet hole 10 and outlet hole 11 by connecting channels 14 and 14A respectively. Here the electrode spacers 2A and 4A are shown fed by the same stream as the dilute spacer 2; however these could be alternatively fed with the same feed as the salt concentrating spacer 4 or with a third stream.

Usually in a system utilizing a plurality of alternating anion and cation-exchange membranes, alternating diluting and concentrating spacer members 2 and 4 are provided. thereby causing liquid entering inlet holes 10 or 10A to flow whrough their respective alternating spacer members. However, for testing electrodes the number of dilute 2 and concentrating spacers 4 is limited to one each rather than being repeated. Each test section consists of an electrode pair 1 and 1A, electrode spacer members 4A and 2A and two cation selective membranes 3 and an anion selective membrane 5. Several of these test sections can be stacked together to test the various electrode pairs. A direct current is impressed across the electrodes with polarity reversal and flow conditions simulated for an actual electrodialysis membrane stack. Thus because of polarity reversal the electrodes 1 and 1A alternately act as anode and cathode electrodes with the two streams 10 and 10A also being switched around so that the concentrating spacer becomes a dilute spacer and the dilute a concentrating spacer.

The foregoing description applies to the structures and operation of electrodialysis systems known in the art, as previously mentioned. Such a system therefore does not per se describe the inventive subject matter of this application, but is included herein in order to make the present invention more clearly understood.

The herein above mentioned short cycle reversal system reduces electrode life thus requiring that the stacks be disassembled at frequent intervals to replace the electrodes. It is the usual practice in polarity reversal electrodialysis plants to employ platinum coated electrolytic valve metals for both the cathode and anode electrodes; since the usual satisfactory cathode materials such as iron, nickel, stainless steel, etc., would be rapidly damaged when used as anode. On the other hand the usual satisfactory anode materials, e.g. valve metals which are clad, coated or plated with platinum, iridium or rhodium, when used alternately as cathodes and anodes have short life spans in short cycle reversal. This necessitates the bothersome and frequent disassembly of stacks and replacement of the electrodes plus the expense involved in fabricating the noble metal electrodes.

It has now been found that the problem of short electrode life and electrode replacement can be obviated by an improved electrode wherein the substrate metal is partially plated in some areas 19 and left unplated in other areas 20. Electrodes configured in such a way will have the effect of increasing local current density for a given current in the areas covered with a noble metal. It has been found that the increase in current density tends to decrease the noble metal loss considerably. Thus, for example, doubling the local current density by covering or plating only half the electrode area reduces the noble metal loss by about one half. In other words the partially plated electrode having about half the amount of noble metal as a fully plated electrode will last about the same time, thereby saving half the amount of noble metal.

Alternatively an electrode having one half of the surface area plated but containing the same total amount of noble metal as an electrode with all the surface area plated will last twice as long thereby avoiding the necessity of frequent stack opening to replace the electrodes. Reducing the noble metal coated area to ⅓ or to 1/5 reduces the loss rate to about ⅓ or to about 1/5 respectively thereby giving a potential savings of about ⅔ or to about 4/5 of the noble metal compared with the fully covered electrodes. There will of course be a practical limit to how far the noble metal plated area is reduced so as not to adversely affect current distribution in the operation of the electrodialysis stack and not to cause excessive voltage drop in the electrode compartments thereby increasing the energy requirement for the desalination process.

In the use of those partially covered area electrodes which have alternating stripes of plated and bare areas, the distance between a pair of plated stripes is chosen so that the voltage drop from the inner edge of the noble metal covered area to the "center" of the uncovered valve metal stripe does not exceed the breakdown voltage; otherwise severe pitting of the unplated area can occur. For titanium the breakdown voltage is about 7-8 volts. The above mentioned voltage drop is approximately $\rho i\, l^2/t$, where $\rho$=specific resistance of the electrolyte; $i$=current density; $t$=thickness of electrode spacer compartment and $l$=distance from the edge of noble metal covered area to the "center" of the uncovered area. If titanium is used, a safe voltage drop is 5 volts before the protective oxide on its starts breaking down. Thus for a spacer thickness of $t$=0.2 cm and $\rho i$=5 volts/cm (corresponding to CD/N of 500 where CD=the current density in ma/cm$^2$ and N=the normality of the electrolyte solution) the maximum half width $l$ of bare titanium strips will be about 0.5 cm. With the use of niobium, which has a breakdown voltage greater than 50, the corresponding half width will be greater i.e. 2.5 cm. Similar considerations apply to geometries other than stripes. Thus a judicious choice is warranted in arriving at a suitable spacing between plated and nonplated areas by taking into consideration the breakdown voltage of the substrate metal, the size of the area to be coated with the noble metal and the proper current distribution between the electrodes.

It is to be noted that when a valve metal is used as the electrode substrate, it will act as an anode only in the noble coated areas whereas all areas (coated and uncoated) will act as the cathode. In situations where scaling is possible the uncoated cathode areas will be prone to scaling. This can be avoided by employing a narrower spacing between the coated areas to allow the acid generated during the anodic cycle to clear off the scale from the uncoated areas.

An alternative way of practicing the invention is to have the electrolytic valve metals (or other metals) electrically connected within the electrode structure to the noble metal covered areas but not exposed to the electrolytic solution, as for example by covering the bare areas (designated as 20 in FIG. 1) with insulating, waterproof tape.

This substantially eliminates the scaling problem since the same active areas are being used as the cathode and the anode in the reversal cycle. Any scale thus formed during the cathodic cycle will dissolve during the anodic cycle.

Still another alternative way of practicing the invention is to employ as the bare areas 20, electrical insulators which are not substantially attacked by the electrolyte and gases that are generated. These electrically insulating regions are preferably positioned essentially coplanar with the noble metal covered areas 19 so that liquid flow through the electrode compartment is not disturbed. The scaling behavior of the electrode will be essentially similar to the case above where insulating tape is applied over the bare metal areas.

The reason as to why reducing the plated area to cause an increase in local current density will reduce noble metal loss may be the development of a higher state of oxidation of the noble metal which has a lower loss rate. Whether this theory is correct or not, the practical application of this invention should not be judged by this.

Figure 2:
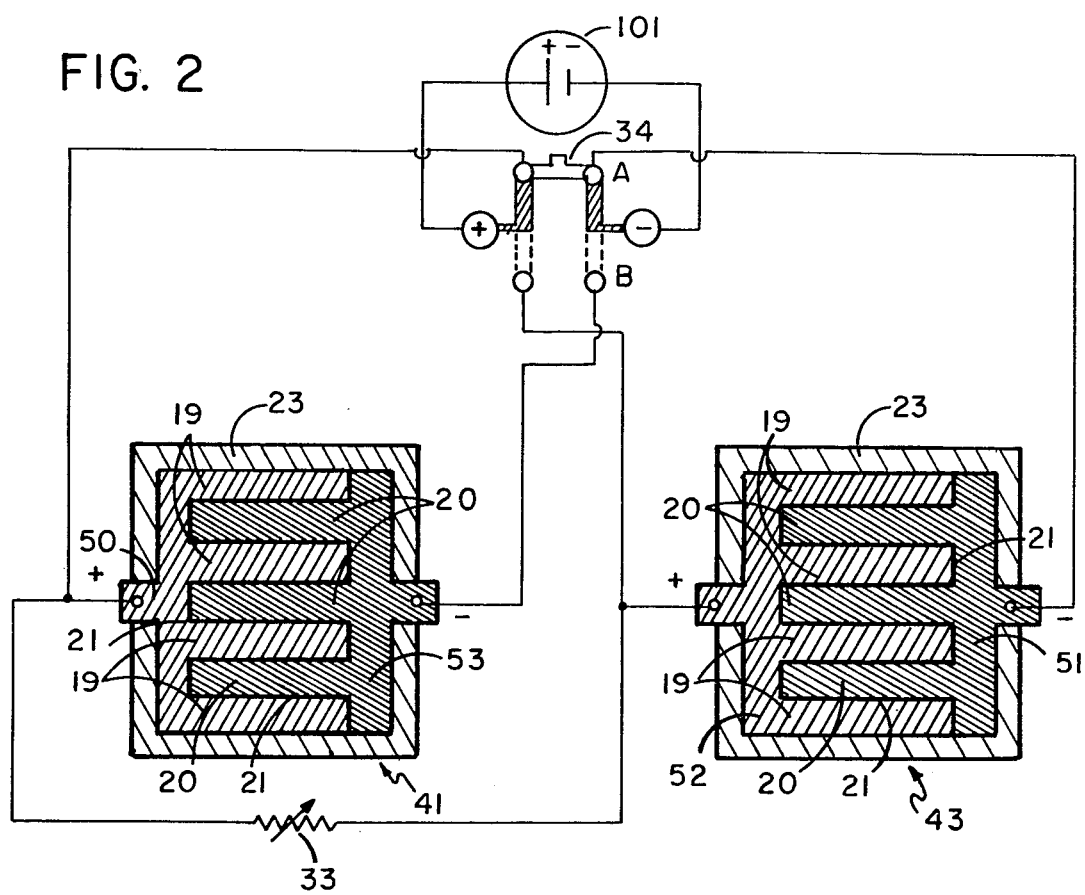
FIG. 2 is a wiring diagram showing the switching means and the manner of impressing a trickle current on the passive anodes of a pair of composite electrodes shown in a plan view.

A further manner of practicing the invention is the case where the electrode area not covered by a noble metal is metallic (or at least electrically conducting), and is further not electrically connected within the electrode structure to the noble metal covered area and is further employed as a cathode when the electrode structure is a working cathode. It has been found that the loss rate of the noble metal is further reduced when the areas covered by noble metal are maintained sufficiently anodically polarized. This arrangement takes advantage of a reduced area electrode configuration as well as preventing the loss of noble metal during the cathodic cycle supposedly by keeping the state of oxidation of the noble metal sufficiently intact. Merely working with the cathode structure (a "non-noble-metal-covered-area" of a conductive metal insulated from the "noble-metal-covered-areas") will not give advantages over reduced area electrode as will be shown in the examples that follow. The non-working anode area must be polarized and constantly generating some oxygen to maintain a state of oxidation. Thus this invention is different from that of Mihara (U.S. Pat. No. 3,454,201) where the non-working segmented anode is not polarized. Depending on the pH of the electrolyte, the noble metal becomes coated with the oxide. For example, platinum at a pH of about 3 is covered with an oxide (PtO) at about 0.8 volts (vs. the standard hydrogen electrode) and with the PtO$_3$ at a voltage of 1.81. [Ref. M. Pourbaix "Atlas of Electrochemical Equilibria" National Association of Corrosion Engineer, Houston, Tex., (1974)]. The objective is to avoid changing the state of oxidation of the noble metal surface since this results in a loss of noble metal. If the anolyte has a pH of 3 and the anode voltage is about 0.8 or greater, then when the polarity is reversed, the voltage of the platinum coated or clad areas should be maintained to at least 0.8 volts vs $^EH$ until the pH of the electrode has again stabilized; at which time it can if so desired then be reduced. For example, if the electrolyte is at pH 11, the voltages vs $^EH$ for PtO and PtO$_3$ are 0.30 and 1.33 respectively. Hence the polarizing voltage may be reduced (if desired) to 0.3 (rather than 0.8 at pH=3) if PtO is involved and to 1.33 if the objective is to keep PtO$_3$ (rather than 1.81 at pH=3). It is not sufficient simply to pass some positive current. FIG. 2 shows the elements of such an arrangement with the electrode structures containing anodic 19 and cathodic 20 areas separated by insulation 21, gaskets 23 and an arrangement for imposing a trickle current on the non-working anode to keep it anodically polarized. Thus in the case of position A of the switch 34, anodic areas 19 of the terminal electrode 41 and cathodic areas 20 of the terminal electrode 43 of a stack such as described in FIG. 1 are operating when connected to the positive and negative poles of a DC source. The electric circuit is completed through the membrane stack and the solutions contained therein. During this period the cathodic areas 20 of electrode 41 and the anodic areas 19 of electrode 43 are passive. However a trickle current is made to flow through an external circuit from anode 50 through a variable resistor 33 to the passive anode 52 of electrode 43. This trickle current helps to keep the passive anode 52 polarized thereby maintaining the oxide layer.

At polarity reversal the switch 34 takes position B, making now the anodic areas 19 of electrode 43 and cathodic areas 20 of electrode 41 operative and simultaneously making the anodic areas 41 and cathodic areas 20 of electrode 43 inoperative or passive. However, now a trickle current is sent from electrode 52 (the active anode of electrode 43) to the passive anode 50 of electrode 41 via an external circuit through a resistor 31 as before.

Figure 3:
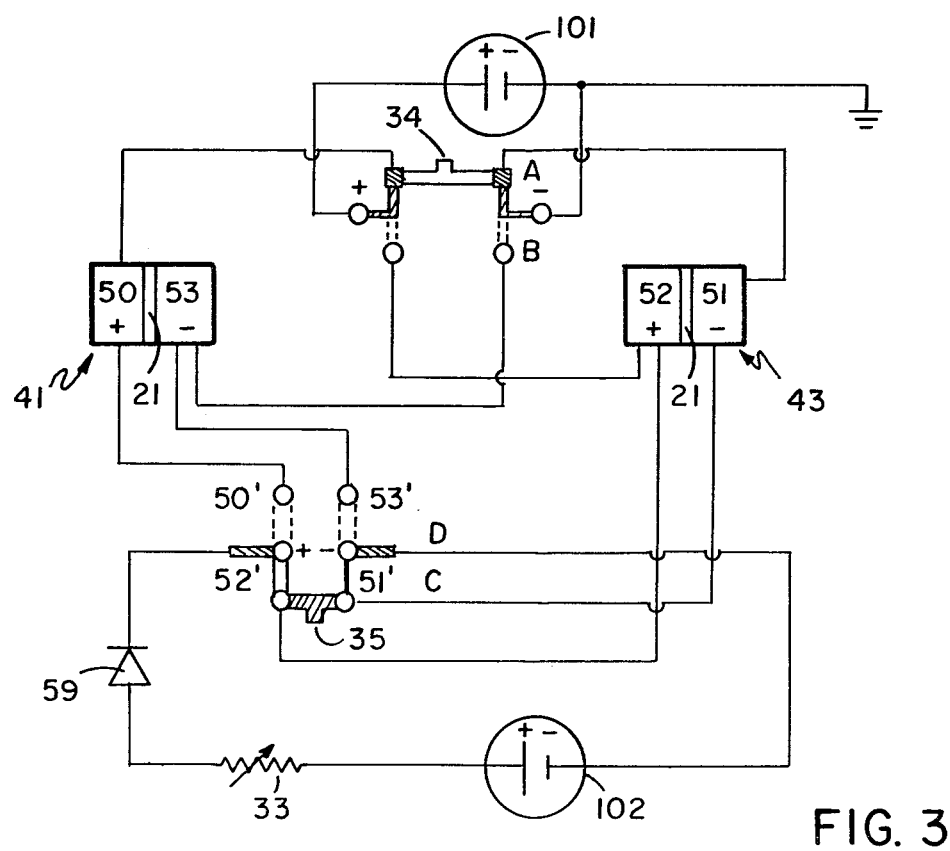
FIG. 3 is a wiring diagram showing an alternate manner of impressing a trickle current through an external circuit and FIG. 4 is a further illustration of a way of using a reversing power supply along with impressing a trickle current.

For impressing a trickle current on the passive anodes one is not limited to the main source of power supply 101. One could substitute an independent circuit e.g. a battery or an isolating transformer. FIG. 3 shows such an alternative external circuit for impressing a trickle current. For convenience, the anodic and cathodic areas of electrode 41 and 43 are represented by 50 and 52 (anodic) and 53 and 51 (cathodic). When the switch 34 is in position A. electrode 41 has the anodic areas 50 and electrode 43 has the cathodic areas 51 activated by the main power supply 101. At his time the trickle current circuit switch 35 is in position C and supplies a trickle current to the passive anode 52 of electrode 43. When the position of switches 34, and 35 is in B and D respectively the trickle current is supplied to the inactive anode 50. Resistor 33 helps to regulate the trickle current. The main power supply 101 has its negative pole grounded. The numerals 50, 51, 52, 53 merely denote the corresponding switch terminals for 50, 51, 52, 53 respectively for connecting the trickle current supply. Diode 59 in the trickle current circuit prevents the current to flow to the battery from the main power supply 101.

Figure 4:
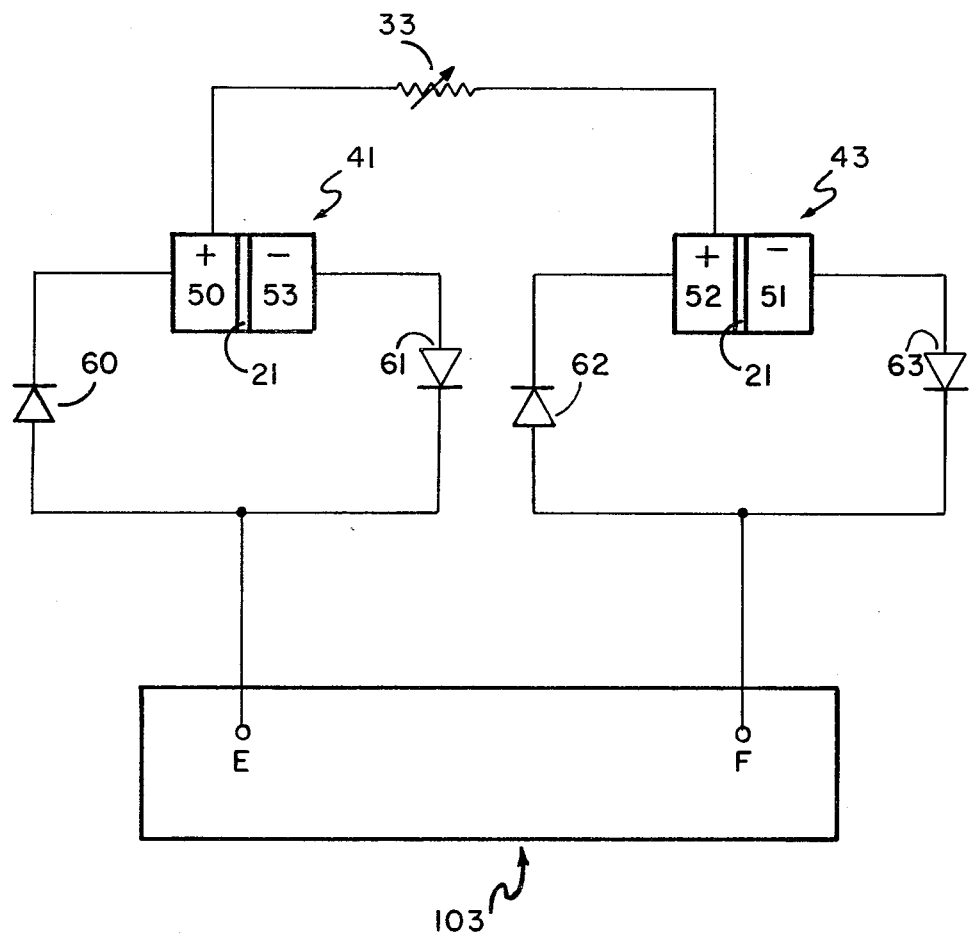

FIG. 4 shows another arrangement using diodes and a reversing polarity power supply 103. Such a circuit can be used instead of a switch 34 such as given in FIG. 2. Here the terminals E and F change in polarity at fixed preset intervals as employed in a polarity reversal type electrodialysis stack. When E is positive, F is negative and the anode portion 50 of electrode 41 is active since the current goes through diode 60 but no current flows through diode 61. Portions 50 and 52 are connected by a variable resistor 33 and hence portion 52 gets a trickle current. The circuit is completed through the solution in the electrodialysis stack and to the active cathode 51 through the diode 63 to the negative terminal F. On polarity reversal, F becomes the positive pole and makes portion 52 an active anode through diode 62 and the circuit is completed through the stack solution, active cathode 53, through diode 61 and to the negative pole E. Here the trickle current flows through resistor 33 to the inactive anode 50.

Thus many arrangements could be conceived of for impressing a trickle current, hence the means disclosed in the examples should not be considered limiting.

EXAMPLE I

A pair of electrodes (designated Nos. 6 and 7 in the table) were fabricated from 20 mil thick code 12 titanium alloy sheet material (9"×10" size) wherein about half of one surface of each sheet was electroplated with platinum in the form of parallel strips with the remaining area left uncoated. The coated and uncoated strips were about one inch wide and arranged in alternating fashion. The electrodes were positioned in the electrode chambers at the terminal ends of an electrodialysis stack. A salt diluting chamber was positioned adjacent one terminal electrode chamber and a salt concentrating chamber adjacent the other electrode chamber. A solution of 3000 ppm of NaCl was used as the feed solution to the chambers of the stack. The platinized portions of the electrodes were operated at a current density of about 22 amp/ft.$^2$ (during anodic cycle) with polarity reversal employed at 15 minute intervals. The table summarizes the platinum loss for these electrodes.

EXAMPLE II

A pair of composite electrodes (identified as Nos. 1 and 2 in the table) were fabricated on a code 12 titanium substrate so that the anode and cathode portion of each composite electrode was in the form of alternating strips adjacently positioned in the same plane but with the anode and cathode portions electrically insulated from each other. The anode portions were electroplated with platinum as in Example I with the cathode portions consisting of the bare, uncoated titanium substrate. Polarity switching means were employed so that during a 15 minute reversal cycle the platinized (anode) portion of the first composite electrode was connected (energized) and the unplatinized (cathode) portion disconnected (de-energized). Simultaneously the cathode portion of the second composite electrode was connected (energized) and the anode portion de-energized. This arrangement is similar to that disclosed in U.S. Pat. No. 3,453,201 (Mihara) and assures that regardless of the polarity cycle, the platinized portions function only during the cathodic cycle. The test stack was operated under conditions similar to Example I and after 1,670 hours the electrodes were removed and examined for platinum loss. As noted in the table, the life of these anodes is not prolonged with respect to those of Example I by using the portions of each composite electrode as anodes or cathodes since each example shows substantially the same rate of platinum loss per amp-hour of operation.

EXAMPLE III

In this Example it was found that the life of the electrodes employed in the system of Example II could be unexpectedly prolonged merely by employing a trickle current to the non-working anode. A circuit containing diodes as show in FIG. 4 was incorporated into the system of Example II to provide for a trickle current to the idle anode. The use of a variable resistor in the circuit allowed adjustment of the trickle current up to about 0.5 amps/ft$^2$. A current of about 0.1 ASF of electrode area was employed in this Example; otherwise operation was under the same conditions as Example II. The table (electrodes 3 and 4) show the dramatic and totally unexpected decrease in platinum loss resulting from use of the present invention. This system of operation allows the use of current reversal throughout the main body of the stack not only to maintain the electrodes and membranes substantially free from precipitate but also (unexpectedly) to prolong the life of the platinized anode coating.

The noble metal cladding, plating or coating for the anodes can be platinum, iridium or rhodium, their oxides or mixtures thereof. For anode substrates and for cathodes, niobium can be used or a titanium alloy which is not substantially corroded in acid solution under reducing conditions. The platinum loss rate for low salinity waters (up to 5,000 ppm) has been determined to be in the range of about 30–80 micrograms per ampere hour ($\mu$g/AH) for platinized titanium alloy and niobium electrodes, when using 15–20 minute polarity reversal cycles. Another unexpected discovery of this invention is that reducing the noble metal coated area of an electrolytic valve metal electrode decreases the noble metal loss therefrom. Electrodes of this type may be fabricated in numerous ways such as by partially plating, coating or cladding the electrodes using certain patterns, such as dots or strips; using conductive rods; or embedding rivets, nails or wires of noble metals or their oxides in or/on one of the above mentioned valve metals or on a non-conductive substrate. The active or working areas will of course need to be externally electrically connected if a non-conductive substrate is used. Thus as an anode the electrode contains a multiplicity of working anode regions in a non-conducting matrix; the majority of these regions in electrically conductive contact with an external current collector. The number of such regions is chosen to give a local current density substantially greater than that of the adjacent membrane, even as much as 10 times. An increase in local current density will result in decreasing the precious metal loss rate per unit time or current. Another advantage of such reduced active anode area electrodes is in the generation of local high acidity areas which will tend to dissolve scale or precipitates formed where the electrode is cathodic. This local high current density mode of operation can be used for single reversal electrodes or in the mode where anodic areas are insulated from cathodic areas described in Example III herein with a positive polarizing current being applied to the inactive anode portion. With a combination of reduced area (high local current density) and single polar operation with trickle current on the inactive anode, the life of the anodes can be increased by a factor of 3 or more resulting in very low noble metal consumption. The following example illustrates the striking effect of using low vs. high local current densities (reduced anode area) on the corrosion rates of the noble metal.

EXAMPLE IV

In this Example three types of electrodes were prepared on titanium alloy sheet substrate which sheet was resistant to corrosion in an acidic, reducing environment. The first (No. 21) in which the total electrode surface was covered with electroplated platinum; a second (No. 7(a)) where only 44% of the surface area was covered with the noble metal and the third (No. 5) with only 20% of the area covered. These electrodes were operated under conditions as described in the previous examples. A current of between 2.8–2.9 amps was passed through these electrodes to give a local current density repectively of about 11.2, 25.4, and 56.0 ASF during the anodic cycle. The table gives the platinum loss rate. It will be noted that operation at the higher current density (56 ASF) resulted in a radical decrease in platinum loss per amp-hour.

EXAMPLE V

An electrode pair (2S-10-1 and 2S-10-3) was prepared on Code 12 titanium sheet with about 20% of the surface of each electrode being coated with platinum to produce a platinum coating density of about 10 gms/ft.$^2$ on the coated areas. Operation of these electrodes were similar to the previous example with an average current of between about 2.5–2.8 amps being employed. (About 10 to 11 ASF based on the active area of the adjacent membrane; about 50 to 55 ASF based on the platinum coated area.) Again, from the table it is noted that platinum loss from these partially coated electrodes (20% surface coating) was substantially decreased even when the coating density was increased about five fold.

EXAMPLE VI

In this Example two types of electrodes were prepared on a niobium flat sheet substrate. Electrode No. 4S-TH-3 was prepared by coating the total electrode surface with thermally reduced platinum and electrode No. 4S-TH-8 with only 44% of its surface being covered. The electrodes were operated under conditions similar to that employed in the previous Example IV but for a much longer period of time. Again as noted from the table, the partially coated electrode operating at the higher local current density (25.4 ASF) showed an unexpected decrease in platinum loss when compared to the electrode operating at the lower local current density (11.2 ASF).

EXAMPLE VII

This example shows the use of roll-clad platinum (rather than plated platinum) on a niobium substrate. One electrode (4S-CL-9) is prepared using 40 micro inches thickness of platinum cladding and leaving no bare areas on the electrode surface. A second electrode (4S-CLST-1) is made with platinum clad strips covering only about half the electrode area; the remaining half area covered by a plastic material of comparable thickness. Thus referring to the electrode (1) of FIG. 1, the areas 19 are platinum clad niobium strips and areas 20 are strips of polyethylene thereby giving a flat sheet electrode of alternating platinum and plastic strips. The clad strips 19 are internally connected electrically to the positive terminal 50. Conditions of operation are similar to those employed in previous examples. The table gives the results for this test and here again the partially platinum covered electrode shows a loss rate of about 60% when compared to the fully platinum covered electrode.

In these Examples, a polarity reversal after every 15 minutes was used but this period is not to be construed as limiting. The reversal cycle may be varied from a few minutes to many hours pending upon the severity of the scaling conditions with the same improved results.

In the claims, platinum coated or noble-metal coated means having a pervious or impervious coating of platinum or noble-metal applied in any manner, e.g. by electroplating, electroless plating, thermal reduction, mechanical cladding, explosive cladding, sputtering etc.

| Electrode No. & Substrate Material | Electrode Area ft$^2$ Platinized | Pt. Coating Density (g/ft$^2$) Initial | Final | Hours of Oper. | Total AMP-Hrs | Pt. Loss Rate ($\mu$g/amp-hrs) |
|---|---|---|---|---|---|---|
| 6 Titanium (Code 12) | 0.14 | 2.04 | 1.66 | 573 | 1590 | 34.3 |
| 7 Titanium (Code 12) | 0.11 | 2.03 | 1.79 | 270 | 770 | 34.3 |
| 1 Titanium (Code 12) | 0.14 | 2.46 | 1.36 | 1670 | 4465 | 34.5 |
| 2 Titanium (Code 12) | 0.11 | 2.40 | 1.02 | 1670 | 4465 | 34.0 |

-continued

| Electrode No. & Substrate Material | Electrode Area ft² Platinized | Pt. Coating Density (g/ft²) Initial | Pt. Coating Density (g/ft²) Final | Hours of Oper. | Total AMP-Hrs | Pt. Loss Rate (μg/amp-hrs) |
|---|---|---|---|---|---|---|
| 3 Titanium (Code 12) | 0.14 | 2.21 | 2.12 | 565 | 1455 | 8.7 |
| 4 Titanium (Code 12) | 0.11 | 2.34 | 2.20 | 565 | 1455 | 10.6 |
| 21 Titanium (Code 12) | 0.25 | 2.11 | 1.96 | 182 | 520 | 72.1 |
| 7(a) Titanium (Code 12) | 0.11 | 2.03 | 1.93 | 139 | 400 | 27.5 |
| 5 Titanium (Code 12) | 0.05 | 2.48 | 2.39 | 272 | 750 | 13.8 |
| 2S-10-1 Titanium (Code 12) | 0.05 | 10.00 | 9.80 | 463 | 1175 | 12.8 |
| 2S-10-3 Titanium (Code 12) | 0.05 | 9.84 | 9.10 | 735 | 2040 | 18.1 |
| 4S-TH-3 Niobium | 0.25 | 1.36 | 0.10 | 3774 | 10724 | 29.4 |
| 4S-TH-8 Niobium | 0.11 | 1.46 | 0.25 | 3643 | 9815 | 13.6 |
| 4S-CL-9 Niobium | 0.25 | 1.96 | 1.84 | 630 | 1745 | 15.8 |
| 4S-CLST-1 Niobium | 0.11 | 2.02 | 1.96 | 261 | 755 | 9.5 |

*The effective total electrode area is 0.25 ft/² in all cases.

Having now fully described this invention, it will be apparent to one of ordinary skill in the art that many changes and modifications can be made thereto without departing from the spirit or scope of the invention set forth herein.

The embodiments of this invention in which an exclusive property or privilege is claimed are defined as follows:

1. An electrodialysis stack comprising ion-permeable membranes spaced from each other to form fluid treatment chambers with a polarity reversing electrode unit positioned at each terminal end of said stack, each electrode unit comprising an anode portion and a cathode portion electrically separated from each other, means for supplying current to the electrode units with switching means for connecting the anode portion of said first electrode to the positive pole of said current supply means while disconnecting the cathode portion thereof, and means for connecting the cathode portion of said second electrode to the negative pole of said current supply means while disconnecting the anode portion thereof, further means for connecting the active anode of said first electrode unit to the inactive anode of said second electrode unit and means to maintain a trickle of positive current to said inactive anode which is substantially less than the current to said active anode, and in the other position of said switch means, the anode portion of said first unit is made passive by being disconnected and the cathode portion being made cathodically active by connection to the negative pole of said current supply means and connecting the anode portion of said second electrode unit to the positive pole of said current supply means while disconnecting the cathode portion, with further means for connecting the active anode of said second electrode unit to supply and maintain a trickle of positive current to said inactive or passive anode portion of said first electrode unit, which current is substantially less than the current to said active anode.

2. An electrode unit as defined in claim 1, wherein said anode and cathode portions are arranged substantially in a plane.

3. An electrode unit as defined in claim 1, wherein said cathode and anode portions of each unit comprises a plurality of strip shaped substantially parallel members, with the strip shaped members of said anode portion alternating with said strip shaped members of said cathode portion, and an elongated support member for each electrode portion integral with said ends of said strip shaped members thereof which face away from the elongated support member of the other electrode portion.

4. In an electrodialysis apparatus, a stack comprising ion-permeable membranes spaced from each other to form fluid treatment chambers with at least one polarity reversing, substantially planar electrode unit positioned at each terminal end of said stack, each electrode unit comprising a plurality of first regions comprising titanium alloys which are substantially corrosion resistant under reducing, acid conditions, coated at least in part with a coating selected from the group consisting of iridium, rhodium and platinum, their oxides and mixtures thereof, the anodically active area of such first region being substantially less than the electrolytically conducting active area of the majority of the ion-permeable membranes in said stack and means for making such first regions, working anodes for a substantial fraction of the time working current is carried by such membranes, such first regions being substantially uniformly distributed over the surface of said electrode unit.

5. Apparatus according to claim 4 in which said first regions are working cathodes for the remainder of the time working current is carried by such membranes.

6. Apparatus according to claim 4 in which said first regions are working anodes for a substantial fraction of the time working current is carried by such membranes and working cathodes for a substantial fraction of such time and in which the co-planar areas separating said first regions from each other are not substantially electrolytically conducting when said first regions are working anodes.

7. Apparatus according to claim 4 in which the co-planar areas separating said first regions from each other are at least in part electrolytically conducting as cathodes at least when said electrode unit is a working cathode.

8. Apparatus according to claim 4 in which the co-planar areas separating said first regions from each other are at least in part cathodically conducting when said first regions are working cathodes.

9. Apparatus according to claim 4 in which the substantially co-planar areas separating said first regions from each other comprise second regions electrically insulated from said first regions within the plane of the electrode unit, said apparatus including means for making said second regions working cathodes when said first regions are not working anodes and means to maintain a positive current to said first regions when such second regions are working cathodes, such positive current being sufficient to maintain the state of oxidation of the surface of such first region.

10. Apparatus according to claim 4 in which the substantially co-planar areas separating said first regions from each other comprise second regions electrically insulated from said first regions within the plane of the electrode unit, said apparatus including means for making said second regions working cathodes when said first regions are not working anodes and means to maintain a positive current to said first regions when said second regions are working cathodes, such positive current being sufficient to generate at least some oxygen on the surface of said first region.

11. Apparatus according to claim 4 in which the substantially co-planar area separating said first regions from each other comprise second regions electrically insulated from said first regions within the plane of the electrode unit, said apparatus including means for making said second regions working cathodes when said first regions are working anodes and means to maintain a positive current to said first regions when said second regions are working cathodes, such positive current being sufficient to maintain the state of oxidation of the surface of such first region, and such apparatus also including means to maintain a negative current being sufficient to maintain the state of reduction of the surface of said second region when said first regions are working anodes.

* * * * *